Sept. 16, 1941.  H. W. EDEN  2,256,019
THERMOHYDROMETER
Filed May 29, 1940
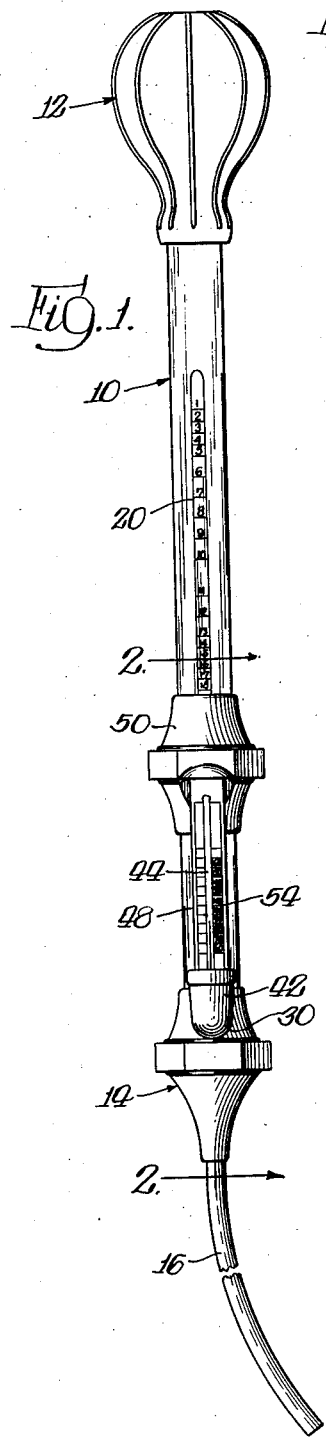
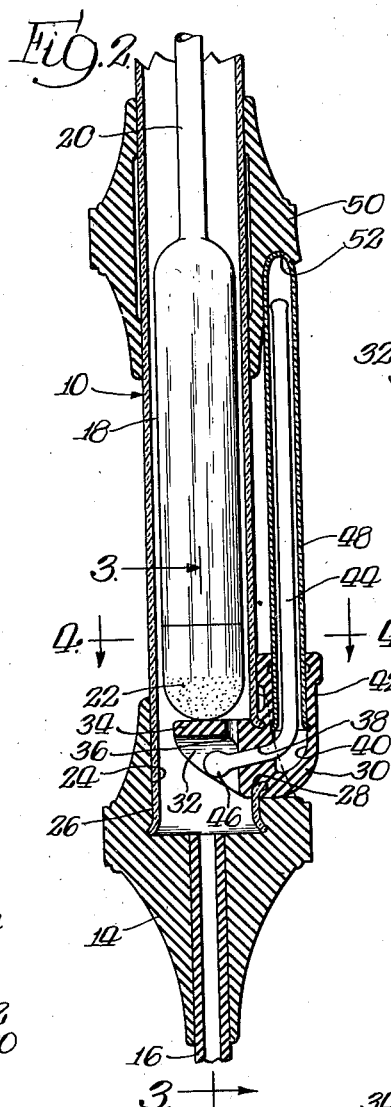
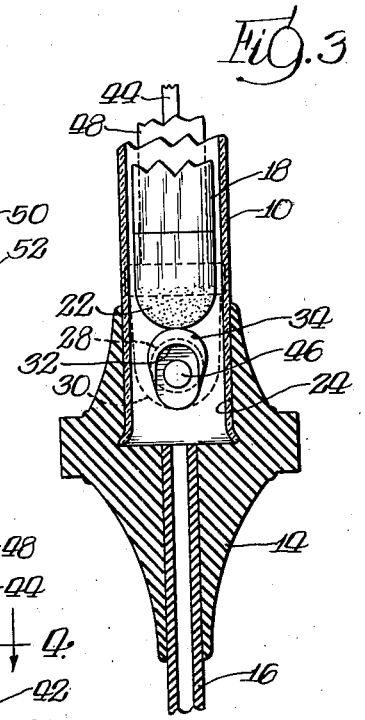
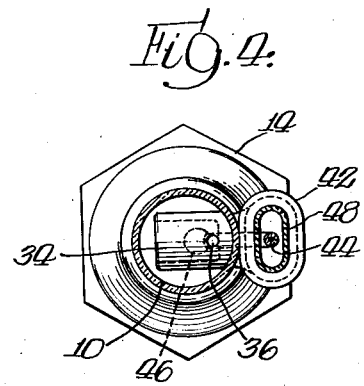
INVENTOR.
Harold W. Eden,
BY Bair & Freeman
ATTORNEYS.

Patented Sept. 16, 1941

2,256,019

UNITED STATES PATENT OFFICE 2,256,019

THERMOHYDROMETER

Harold W. Eden, Chicago, Ill., assignor to The Imperial Brass Manufacturing Company, Chicago, Ill., a corporation of Illinois Application May 29, 1940, Serial No. 337,815

5 Claims. (Cl. 265—46)

My invention relates to measuring devices and particularly thermohydrometers of the sort regularly used to simultaneously measure temperature and specific gravity of a liquid. Among the objects of my invention is to provide a new and improved thermohydrometer which is capable of quickly and accurately measuring the temperature and specific gravity of a liquid.

Another object is to provide a new and improved measuring device for both temperature and specific gravity, which has a temperature responsive element positioned so as to be directly and immediately affected by the same portion of the liquid which is being used to obtain a measure of the specific gravity.

Still another object is to provide a new and improved device for the measuring of temperature and specific gravity at the same time, which includes a single element attached to seal a thermometer bulb in a space immediately adjacent a weighted specific gravity float and which includes a resilient portion providing a protective bumper for the float, preventing harmful contact thereof with the thermometer bulb; it being also the object to provide an open cavity with a passage leading through it, so as to direct liquid into a circulating path about the thermometer bulb when it is drawn into contact with the weighted specific gravity float to enable the thermometer to precisely measure the temperature of liquid at the temperature immediately adjacent the float.

With these and other objects in view, my invention consists in the construction, arrangement and combination of the various parts of my thermohydrometer whereby the objects contemplated as well as other obvious objects are attained, as hereinafter more fully set forth, illustrated in the accompanying drawing, and covered in the appended claims.

With reference to the drawing:

Figure 1 is a vertical elevation view of my device.

Figure 2 is a vertical section of the lower part of the device taken on the line 2—2 of Figure 1, showing the weighted specific gravity float and the thermometer mounting.

Figure 3 is a vertical section taken on the line 3—3 at right angles to the section shown in Figure 2.

Figure 4 is a cross-sectional view taken on the line 4—4 of Figure 2.

In the construction of measuring means for taking the measure of both temperature and specific gravity simultaneously, it is necessary that the liquid being measured have the same characteristics at the places where both measuring devices are in contact with it. A variation in temperature has a direct effect on the apparent specific gravity. When it is borne in mind that the measuring apparatus itself is often at a temperature different from that of the liquid to be measured, as for example in zero weather, it will be understood that considerable variation in temperature may be present in liquid drawn into different parts of the interior cavity. Unless the liquid is free to circulate about both types of measuring devices it must be read instantaneously before there is a change in the temperature brought about by cooling due to the coldness of the measuring instrument itself. Otherwise the measuring instruments must be responsive to the liquid at the same, precise spot, so that liquid of the same temperature characteristics affects both.

In the embodiment of my device, herein shown to illustrate my invention, a compact arrangement of thermometer and specific gravity float is incorporated in such a way that liquid which affects the float flows directly past and into contact with the thermometer bulb placed immediately adjacent the float.

In the drawing there is shown a transparent barrel 10 having a suction bulb 12 at the upper end, and a nozzle fitting 14 at the lower end. In normal use a hose 16, extending from the nozzle, is inserted into a liquid and the bulb 12 pressed and then allowed to expand drawing liquid up through the hose 16 and into the barrel 10 where the measurements of specific gravity and temperature are made.

Within the barrel there is provided a weighted float 18 which has a tubular upper end 20 graduated and bearing numbers on a visible scale. The lower end 22 of the float is weighted, with shot for example, to give it the proper buoyancy. The body of the float is only slightly smaller than the inside diameter of the barrel, to permit its freedom of movement up and down when liquid is drawn into the barrel.

The nozzle 14 has in it an aperture 24 which is adapted to snugly receive a lower end 26 of the barrel which is belled out at the bottom edge in order to form a tight joint. At the lower end of the barrel and to the right as viewed in Figure 2 there is provided an opening 28. It will be noted that the opening is well toward the lower end at a point within the aperture 24.

A resilient grommet 30 is shown inserted in the opening 28 forming a tight seal around the edge. The grommet has at its inside end a recess 32 which opens laterally and downwardly with respect to the lower end of the barrel. On the upper side of the recess a portion of the grommet extends into the barrel beneath the weighted float forming a flap 34. An aperture 36 forms a passage through the flap connecting the recess 32 and the inside of the barrel containing the float at a point above the grommet.

In the grommet is likewise a passage 38 extending from the recess outwardly within the opening 28 and at the outer end of the passage is an enlarged portion 40. The outer end of the grommet likewise has an upwardly extending arm 42 within which a continuation of the enlargement extends.

A thermometer 44 is shown with a bulb 46 positioned within the recess 32 at the inner end of the grommet. The shaft of the thermometer lies sealed in the passage 38 and extends therefrom at an angle in an upward direction parallel to the barrel.

Surrounding the thermometer is a flat tubular sleeve 48 which has its lower end secured in the outer end of the grommet within the enlargement 40. In order to hold the sleeve steady it is provided with a resilient collar 50 surrounding the barrel in which is a recess 52 adapted to receive the upper end of the sleeve 48. Within the sleeve there is provided a scale 54 graduated and marked to indicate degrees.

In operation liquid is drawn into the barrel 10 through the hose 16 and nozzle 14. As liquid passes into the barrel it first enters the aperture 24. Then the level of liquid gradually rises within the barrel until it surrounds the weighted specific gravity float 18. As liquid passes from the lower end of barrel to its position around the float, it flows around and into contact with the thermometer bulb 46. The flap at the inner end of the grommet serves to deflect liquid directly toward the thermometer bulb, a large portion of which is by-passed through the aperture 36. Since it is only a relatively short distance between the thermometer bulb 46 and the weighted float, the temperature of liquid affecting the float is immediately registered on the thermometer bulb without appreciable variation. Moreover, any slight change in the temperature of liquid surrounding the float directly affects the thermometer bulb. By reason of the fact that the visible portion of the thermometer adjacent the graduated scale 54 is out of contact with the liquid being measured, the temperature can be quickly and easily read at the same time as the reading is taken of the specific gravity by means of the figures on the tube 20.

When the liquid has been measured and is expelled out of the barrel the specific gravity float ordinarily descends quite rapidly. In the applicant's device the float on descending is stopped and cushioned by the relatively thin resilient flap 34 which forms at the same time a partition for the recess 32. By this simple device which serves a double purpose, damage to both float and thermometer bulb is avoided.

There has thus been provided a sensitive, accurate measuring device for both specific gravity and temperature of a liquid, which is compact in its arrangement and certain in operation.

I claim as my invention:

1. In a bulb hydrometer including a barrel having a lateral opening adjacent one end, an apertured cap forming a nozzle at said end for attaching a hose, a suction bulb at the other end and a weighted gravity float shiftable endwise in the barrel, the combination of a grommet having a passage therethrough positioned with one end projecting through the lateral barrel opening, a portion of said grommet at the inside end extending into the barrel beneath the float protending into a support therefor, a recess in the lower side of said portion of the grommet to receive the bulb of a thermometer, the other end of said grommet being outside the barrel, and a thermometer having a bulb in the recess extending in sealed relationship through the passage in said grommet to a position outside the barrel forming thereby a visual temperature indicator for liquid drawn into the barrel to be measured.

2. In a bulb hydrometer including a transparent barrel having a lateral opening adjacent one end, an apertured cap forming a nozzle at said end for attaching a hose, a suction bulb at the other end and a weighted gravity float shiftable endwise in the barrel, the combination of a grommet of relatively soft material having a passage therethrough positioned with one end projecting through the lateral barrel opening, an open recess at the inside end of the grommet, a portion of said inside end extending into the barrel beneath the float providing a cushioned support therefor, the other end of said grommet being outside the barrel, a sleeve of transparent material containing a scale connected to the grommet with one end covering the passage therethrough, and a thermometer having a bulb in the recess formed by the grommet extending in sealed relationship through the passage in said grommet and extending upwardly within the sleeve forming thereby a visual temperature indicator for liquid drawn into the barrel to be measured.

3. In a bulb hydrometer including a transparent barrel having a lateral opening adjacent one end, an apertured cap forming a nozzle at said end for attaching a hose, a suction bulb at the other end and a weighted gravity float shiftable endwise in the barrel, the combination of a grommet of resilient material having a passage therethrough positioned with one end projecting through the lateral barrel opening, an open recess at the inside end of the grommet, a portion of said inside end extending into the barrel beneath the float providing a cushioned support therefor, and an aperture through the support comprising a by-pass for liquid flowing around the bulb, the other end of said grommet being outside the barrel, a sleeve of transparent material containing a scale connected to the grommet with one end covering the passage therethrough, means on the barrel supporting the other end and a thermometer having a bulb in the recess of the grommet extending in sealed relationship through the passage in said grommet and extending upwardly within the sleeve forming thereby a visual temperature indicator for liquid drawn into the barrel to be measured.

4. In a bulb hydrometer including a transparent barrel having a lateral opening adjacent one end, an apertured cap forming a nozzle of rubber-like material at said end for attaching a hose, a suction bulb at the other end and a weighted gravity float shiftable endwise in the barrel, the combination of a grommet of resilient material having a passage therethrough positioned with one end projecting through the lateral barrel opening, a downwardly open recess at the inside end of the grommet, a portion of said inside end extending across the interior of the barrel beneath the float providing a cushioned support therefor, and an aperture through the support comprising a by-pass for liquid flowing around the bulb, the other end of said grommet being outside the barrel and having a vertically extending portion and an enlarged aperture therein, a sleeve of transparent material containing a scale mounted with one end in said aperture, a resilient collar on the barrel supporting the other end and a thermometer having a bulb in the recess of the grommet extending in sealed relationship through the passage in said grommet and extending upwardly within the sleeve forming thereby a visual temperature indicator for liquid drawn into the barrel to be measured.

5. In a bulb hydrometer including a transparent barrel having a lateral opening adjacent one end, an apertured cap forming a nozzle of rubber-like material at said end for attaching a hose, a suction bulb at the other end and a weighted gravity float shiftable endwise in the barrel, the combination of a grommet of resilient material bent at a substantially right angle having a passage therethrough positioned with one end projecting through the lateral barrel opening, a laterally and downwardly open recess at the inside end of the grommet, a flap on the upper side of the recess extending into the barrel beneath the float providing a cushioned support therefor and an aperture through the flap comprising a by-pass for liquid flowing around the bulb, the other end of said grommet being outside the barrel and having a vertically extending portion and an enlarged aperture therein, a flat sleeve of transparent material containing a scale mounted with one end in said aperture, a resilient collar on the barrel supporting the other end, and a thermometer having a bulb in the recess of the grommet extending in sealed relationship through the passage in said grommet and extending upwardly within the sleeve forming thereby a visual temperature indicator for liquid drawn into the barrel to be measured.

HAROLD W. EDEN.